United States Patent
Lai et al.

(10) Patent No.: US 7,800,744 B2
(45) Date of Patent: Sep. 21, 2010

(54) DETECTION SYSTEM FOR IDENTIFYING FAULTS IN PASSIVE OPTICAL NETWORKS

(75) Inventors: Yin-Tse Lai, Miaoli County (TW); Shien-Kuei Liaw, Taoyuan County (TW); Yi-Tseng Lin, Taichung County (TW)

(73) Assignee: National Taiwan University of Science & Technology, Taipei (TW)

(*) Notice: Subject to any disclaimer, the term of this patent is extended or adjusted under 35 U.S.C. 154(b) by 321 days.

(21) Appl. No.: 11/852,622

(22) Filed: Sep. 10, 2007

(65) Prior Publication Data

US 2008/0062408 A1    Mar. 13, 2008

(30) Foreign Application Priority Data

Sep. 11, 2006  (TW) .............................. 95133542 A

(51) Int. Cl.
*G01N 21/00* (2006.01)

(52) U.S. Cl. ..................................................... 356/73.1
(58) Field of Classification Search ..................... None
See application file for complete search history.

(56) References Cited

U.S. PATENT DOCUMENTS

| 5,491,573 | A  | * | 2/1996  | Shipley ....................... 398/13 |
| RE36,471  | E  | * | 12/1999 | Cohen .......................... 398/82 |
| 6,009,220 | A  | * | 12/1999 | Chan et al. ................... 385/24 |

* cited by examiner

*Primary Examiner*—Tu T Nguyen
(74) *Attorney, Agent, or Firm*—Rosenberg, Klein & Lee

(57) ABSTRACT

A detection system that performs in a passive optical network is disclosed. The detection system uses a central office to provide detection signals to corresponding fiber branches for obtaining different reflected signals based on different optical network models. Hence, the central office can determine whether fiber branches in the passive optical network has a fault and where the fault is according to the reflected signals.

16 Claims, 10 Drawing Sheets

DETECTION SYSTEM FOR IDENTIFYING FAULTS IN PASSIVE OPTICAL NETWORKS

BACKGROUND OF THE INVENTION

1. Field of the invention

The present invention relates to the structure of a fiber network, and more particularly to a detection system for identifying faults in a passive optical network.

2. Description of the Prior Art

In the prior art, when one of the fiber branches of a fiber communication network has a fault, it is very important to discover the broken fiber branch and the broken position of the fiber branch as fast as possible. Thereby, the fiber communication network can maintain the quality of signal transmission.

The detection system of the prior art is shown in FIG. 1. The detection system includes a main control section 1, a fiber trunk connected to the main control section, a plurality of fiber branches connected to the fiber trunk via a splitter 2, and a plurality of user stages respectively connected to a corresponding fiber branch.

The main control section 1 includes a plurality of signal sources, an optical circulator 15, a first coupling unit that includes a wavelength division multiplexing (WDM) coupler 18, and an optical coupler, a pumping source 16, and a hookup survival detection unit 17. The hookup survival detection unit 17 can be an optical spectrum analyzer (OSA). Each of the fiber branches is a single mode fiber and includes a fiber Bragg grating (FBG) such as an FBG 31, 41, 51, or 61, a thin film filter such as the thin film filter 33, 43, 53, or 63, and a user stage such as the user stage 35, 45, 55, or 65.

The first signal source 11 provides a data signal $\lambda 1$. The second signal source 12 provides a data signal $\lambda 2$. The third signal source 13 provides a data signal $\lambda 3$. The fourth signal source 14 provides a data signal $\lambda 4$. The coupler couples the data signals to the optical circulator 15, and the optical circulator 15 transmits the data signals to the WDM coupler 18 for being further fed into the fiber trunk. Next, the splitter 2 transmits the data signals from the fiber trunk to each of the fiber branches, wherein each fiber trunk has the data signals $\lambda 1$ through $\lambda 4$ transmitted within.

Otherwise, the pumping source 16 simultaneously provides a pumping laser light $\lambda 5$ to the fiber trunk that includes a single mode fiber SMF and an Erbium-doped fiber EDF. The pumping laser light $\lambda 5$ pumps the Erbium-doped fiber EDF to emit an amplified spontaneous emission (ASE) with a band as detection signals such as the detection signals $\lambda 51$ through $\lambda 54$.

Because each of the FBGs has its individual center wavelength (Bragg condition), the center wavelength of each FBG is set to equal the frequency of each detection signal. Because each of the thin film filters has its individual transmission frequency band, the transmission frequency band of each thin film filter is set to equal the frequency band of each data signal.

Hence, each of the data signals is transmitted to the corresponding user stage, and each of the detection signals is reflected to generate a corresponding reflected signal. The data signal $\lambda 1$ is transmitted to the first user stage 35, and the detection signal $\lambda 51$ is reflected to generate the reflected signal $\lambda'51$. The data signal $\lambda 2$ is transmitted to the second user stage 45, and the detection signal $\lambda 52$ is reflected to generate the reflected signal $\lambda'52$. The data signal $\lambda 3$ is transmitted to the third user stage 55, and the detection signal $\lambda 53$ is reflected to generate the reflected signal $\lambda'53$. The data signal $\lambda 4$ is transmitted to the fourth user stage 65, and the detection signal $\lambda 54$ is reflected to generate the reflected signal $\lambda'54$.

Finally, the reflected signals are transmitted back to the hookup survival detection unit 17. The hookup survival detection unit 17 further uses the reflecting signals to identify whether each fiber branch has a fault or not. The spectrum of the signal transmitted in the broken fiber branch is different to the spectrum of the signal transmitted in an unbroken fiber branch.

However, the detection system of the prior art cannot discover the fail position of the broken fiber branch. This disadvantage causes difficultly to the user stages performing maintenance work on the fiber communication network.

SUMMARY OF THE INVENTION

It is an object of the present invention that the detection system can determine whether a fiber branch has a fault therein.

It is a second object of the present invention that the detection system can discover the fail position of the broken fiber branch.

In order to achieve the above objects, the present invention provides a detection system for identifying faults in a passive optical network.

In the first embodiment of the present invention, the detection system includes a main control section, a fiber trunk connected to the main control section, a plurality of fiber branches connected to the fiber trunk via a splitter, and a plurality of user stages respectively connected to the corresponding fiber branch. The main control section includes a plurality of signal sources, a coupler connected to the signal sources, an isolator connected to the coupler, two proportion couplers, a fault position detection unit, and a hookup survival detection unit, wherein the hookup survival detection unit is an OSA. The fault position detection unit and the hookup survival detection unit is connected to one of the proportion couplers, while the other proportion coupler is installed on the fiber trunk. Each fiber branch also has a reflected and filtering unit that is connected to a corresponding user stage.

In the second embodiment of the present invention, the spectrum of the second embodiment is similar to the first embodiment, but it should be noted that the hookup survival detection unit includes a demultiplexer and a plurality of optical sensors, wherein each optical sensor corresponds to a corresponding fiber branch.

In the third embodiment of the present invention, the spectrum of the third embodiment is similar to the second embodiment, but it should be noted that the hookup survival detection unit includes a demultiplexer, a switch, and an optical sensor.

In the fourth embodiment of the present invention, the detection system includes a main control section, a fiber trunk connected to the main control section, an array waveguide grating connected to the fiber trunk, a plurality of fiber branches connected to the array waveguide grating, and a plurality of user stages respectively connected to the corresponding fiber branch. The main control section includes a plurality of signal sources, a WDM coupler, an optical coupler, and a fault position detection unit.

In the fifth embodiment of the present invention, the spectrum of the fifth embodiment is similar to the fourth embodiment, but it should be noted that the main control section further includes a hookup survival detection unit and each fiber branch further has a reflected unit. The hookup survival detection unit and the fault position detection unit connect to the proportion coupler which is in turn connected to the WDM coupler, and the WDM coupler connects in turn to the fiber trunk.

In the sixth embodiment of the present invention, the spectrum of the sixth embodiment is similar to the fourth embodiment, but it should be noted that the main control section further includes a hookup survival detection unit. The hookup survival detection unit connects to the fiber trunk via the proportion coupler, and the fault position detection unit connects in turn to the fiber trunk via the WDM coupler.

In the seventh embodiment of the present invention, the spectrum of the seventh embodiment is similar to the fourth embodiment, but it should be noted that the main control section further includes a switch unit. Each switch path of the switch unit corresponds to a corresponding fiber branch.

In the eighth embodiment of the present invention, the spectrum of the eighth embodiment is similar to the seventh embodiment, but it should be noted that the main control section further includes a hookup survival detection unit and the array waveguide grating is substituted by the DWDM demultiplexer. The hookup survival detection unit and the fault position detection unit connect to the switch unit in order to be further connected to the fiber trunk via the proportion coupler, wherein the hookup survival detection unit connects to the switch of the switch unit.

In the ninth embodiment of the present invention, the spectrum of the ninth embodiment is similar to the seventh embodiment, but it should be noted that the DWDM multiplexer is substituted for the array waveguide grating, wherein the number of channels of the DWDM demultiplexer is double of the user stages. Each two of the channels of the DWDM demultiplexer connect to one coupler in order to further connect to a corresponding fiber branch.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

The detection system of the present invention can be applied to a passive optical network (PON) and determines whether there is a fault on paths of a fiber network, or discovers the positions of faults on the paths of the fiber network. It should be noted that the detection system can be a tree topology, a ring topology, a star topology, a bus topology, etc. All methods are based on the needs of user stages.

Figure 1:
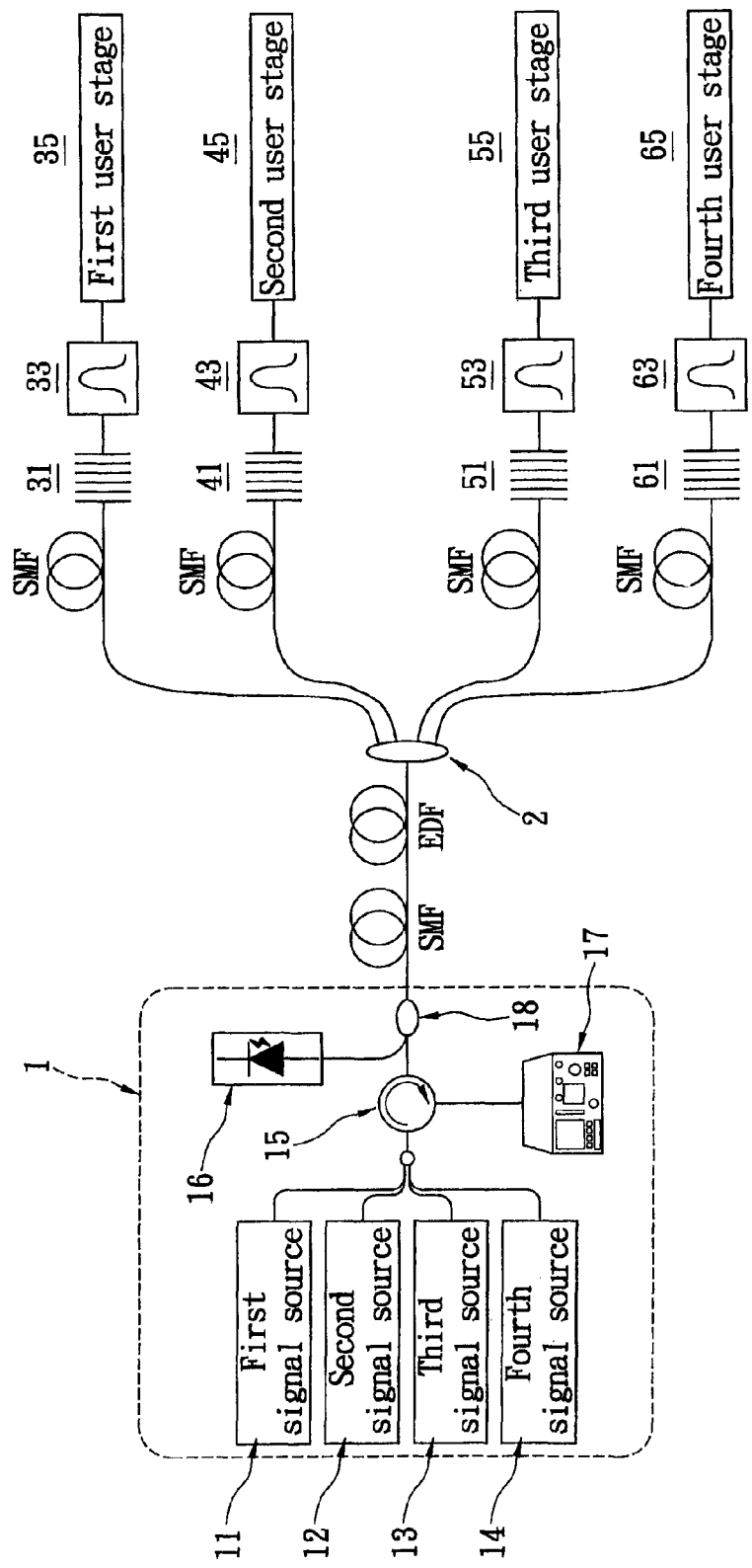
FIG. 1 is a structural diagram of the detection system of the previous invention for identifying faults.
Figure 2:
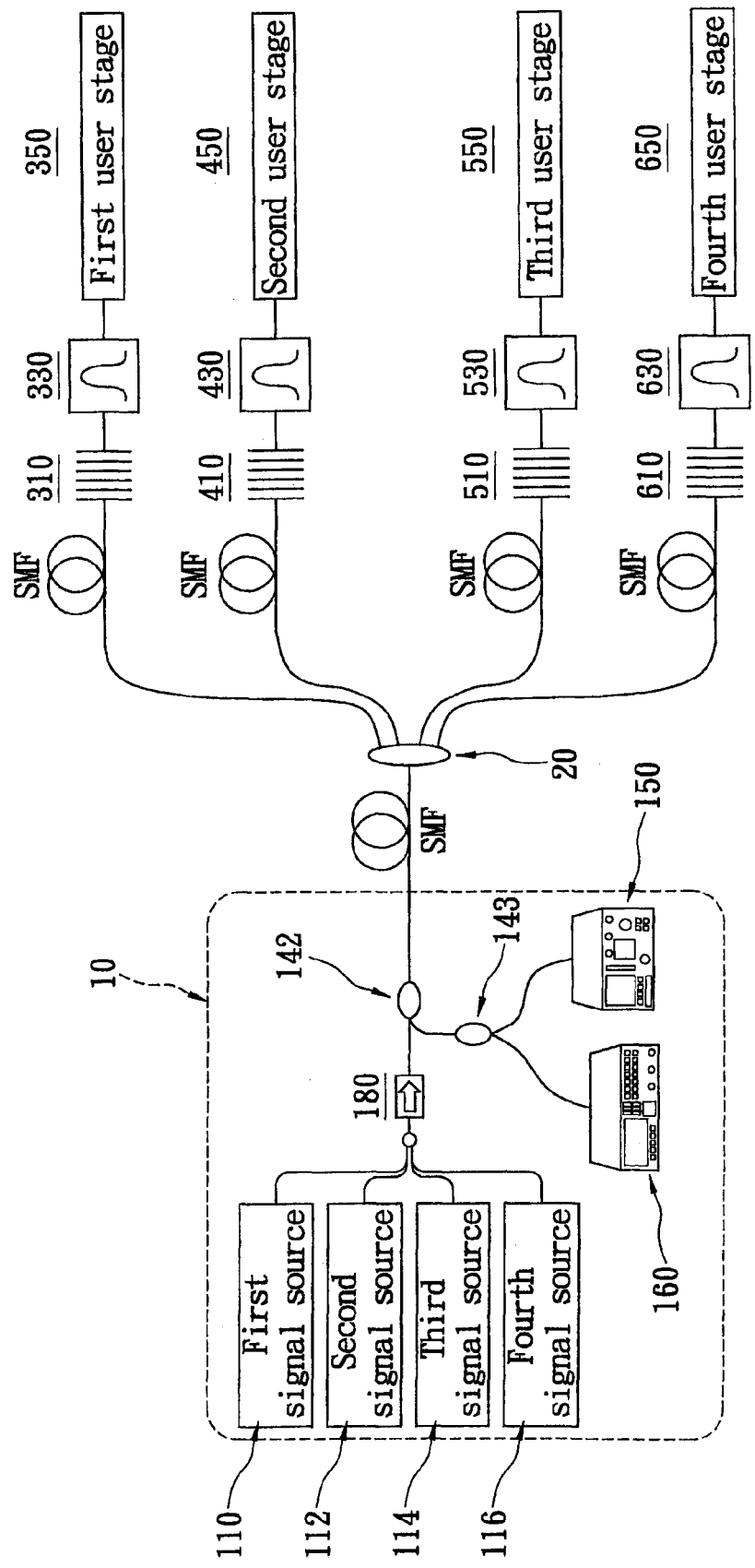
FIG. 2 is a structural diagram of the first embodiment of the detection system of the previous invention for identifying faults.

FIG. 2 shows a structural diagram of the detection system of the first embodiment of the present invention. The main control section 10 includes a plurality of signal sources, an isolation device 180, a coupling unit, a hookup survival detection unit 150, and a fault position detection unit 160. The signal sources can include a first signal source 110 through a fourth signal source 116. The coupling unit can include the proportion couplers 142 and 143. The fiber trunk can be a single mode fiber SMF. The fault position detection unit 160 can be an optical time domain reflector (OTDR).

The first signal source 110 provides a data signal $\lambda 1$. The second signal source 112 provides a data signal $\lambda 2$. The third signal source 114 provides a data signal $\lambda 3$. And the fourth signal source 116 provides a data signal $\lambda 4$. Simultaneously, the fault position detection unit 160 provides detection signals $\lambda 51$ through $\lambda 54$. The proportion coupler 142 couples the data signals and the detection signals to the fiber trunk in proportion. The detection system further feeds respective data signals and respective detection signals into a corresponding fiber branch via the splitter 20.

Next, each data signal is transmitted via the corresponding fiber branch for further transmission to a corresponding user stage via a corresponding fiber Bragg grating. Moreover, each detection signal is transmitted via the corresponding fiber branch for being further reflected by a corresponding thin film filter as a corresponding reflected signal.

The data signal $\lambda 1$ is transmitted via a first fiber branch for further transmission to the first user stage 350 via a fiber Bragg grating 310. The data signal $\lambda 2$ is transmitted via a second fiber branch for further transmission to a second user stage 450 via a fiber Bragg grating 410. The data signal $\lambda 3$ is transmitted via a third fiber branch for further transmission to a third user stage 550 via a fiber Bragg grating 510. The fourth data signal $\lambda 4$ is transmitted via a fourth fiber branch for further transmission to a fourth user stage 650 via a fiber Bragg grating 610.

The detection signal $\lambda 51$ is transmitted via the first fiber branch and is reflected by a thin film filter 330 to generate a reflected signal $\lambda'51$. The detection signal $\lambda 52$ is transmitted via the second fiber branch and is reflected by the thin film filter 430 to generate the reflected signal $\lambda'52$. The detection signal $\lambda 53$ is transmitted via the third fiber branch and is reflected by the thin film filter 530 to generate the reflected signal $\lambda'53$. The detection signal $\lambda 54$ is transmitted via the fourth fiber branch and is reflected by the thin film filter 630 to generate the reflected signal $\lambda'54$.

Finally, the reflected signals are transmitted in proportion to the hookup survival detection unit 150 and the fault position detection unit 160. If a fiber has a fault (broken), the fault will cause Fresnel reflection in the broken section. The hookup survival detection unit 150 can use the reflected signals to determine whether each fiber branch has a fault or not.

The fault position detection unit 160 can use the reflected signals to discover the position of the fault in each fiber branch.

Figure 3:
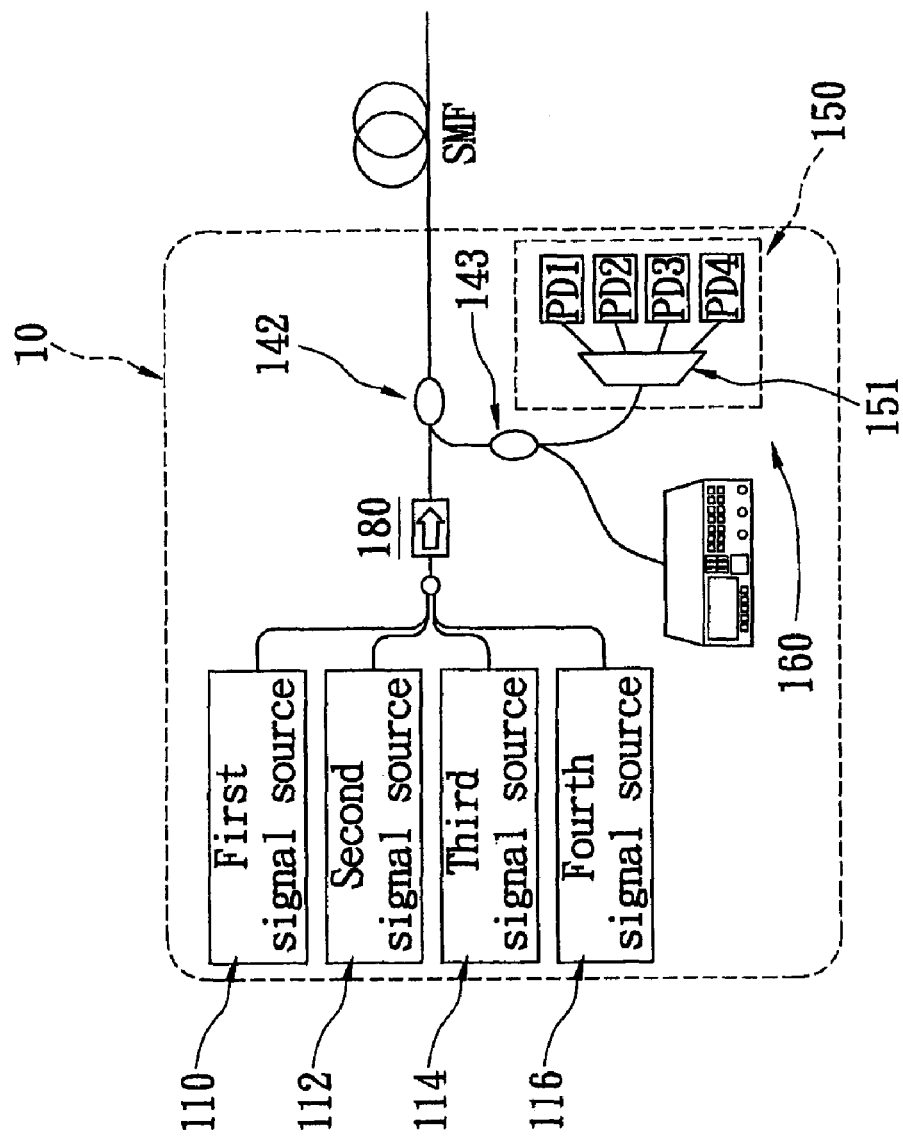
FIG. 3 is a structural diagram of the second embodiment of the detection system of the previous invention for identifying faults.

The second embodiment of the present invention is shown in FIG. 3. It should be noted that the hookup survival detection unit 150 includes a demultiplexer 151 and a plurality of optical sensors in the main control section 10 of the second embodiment. The optical sensors can be photodiodes and are respectively the optical sensor PD1 through PD4, wherein each optical sensor corresponds to a fiber branch.

When the reflected signals are transmitted to the hookup survival detection unit 150 and the fault position detection unit 160 via the proportion couplers 142 and 143, the demultiplexer 151 respectively transmits the reflected signals to an optical sensor. The reflected signal $\lambda'51$ is transmitted to the optical sensor PD1. The reflected signal $\lambda'52$ is transmitted to the optical sensor PD2. The reflected signal $\lambda'53$ is transmitted to the optical sensor PD3. The reflected signal $\lambda'54$ is transmitted to the optical sensor PD4.

Hence, each optical sensor can use the received reflected signals to determine whether each fiber branch has a fault or not.

Figure 4:
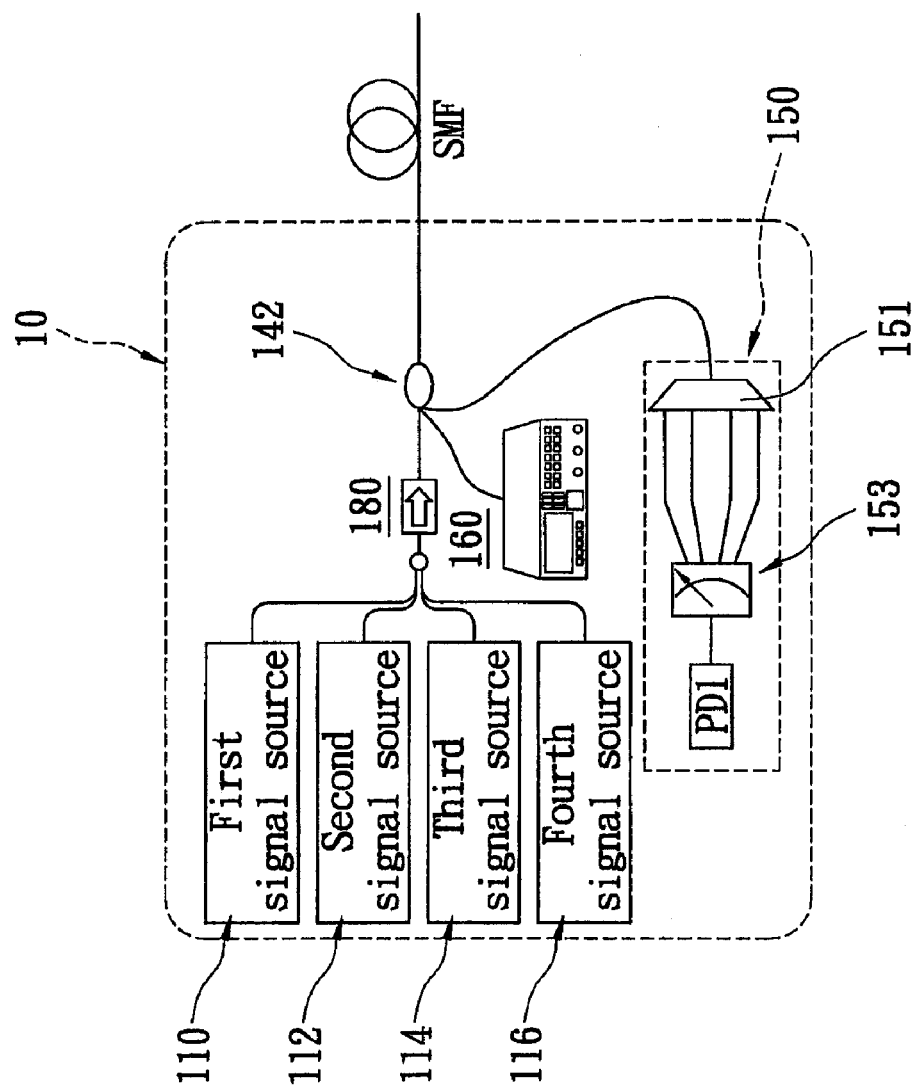
FIG. 4 is a structural diagram of the third embodiment of the detection system of the previous invention for identifying faults.

The third embodiment of the present invention is shown in FIG. 4. It should be noted that the hookup survival detection unit 150 includes a demultiplexer 151, a switch 153, and an optical sensor PD1. The optical sensor PD1 can be an avalanche photodiode (APD) or any other type of sensing diode.

When the reflected signals are transmitted to the hookup survival detection unit 150 and the fault position detection unit 160 via the proportion couplers 142 and 143, the demultiplexer 151 respectively transmits the reflected signals to the optical sensor PD1 according to a switch of the switch 153. That is, the switch 153 selects one of the reflected signals to transmit the selected reflected signal to the hookup survival detection unit 150 and the fault position detection unit 160. Hence, the optical sensor PD1 can use each received reflected signal to determine whether each fiber branch has a fault or not.

In the description of the above embodiments, the fiber Bragg gratings is associated with the fibers to act as a reflected and filtering unit that reflects and filters signals. Moreover, the fiber trunks and the fiber branches are single mode fibers. However, the present invention is not limited by the above description. The fiber trunks and the fiber branches can be single mode fibers, multimode fibers (MMF), or dispersion compensated fibers (DCF) in the first through the third embodiments. The reflected and filtering unit can be a device with an equivalent reflective capacities and an equivalent band, such as a reflective filter, a transflective filter, etc.

Figure 5:
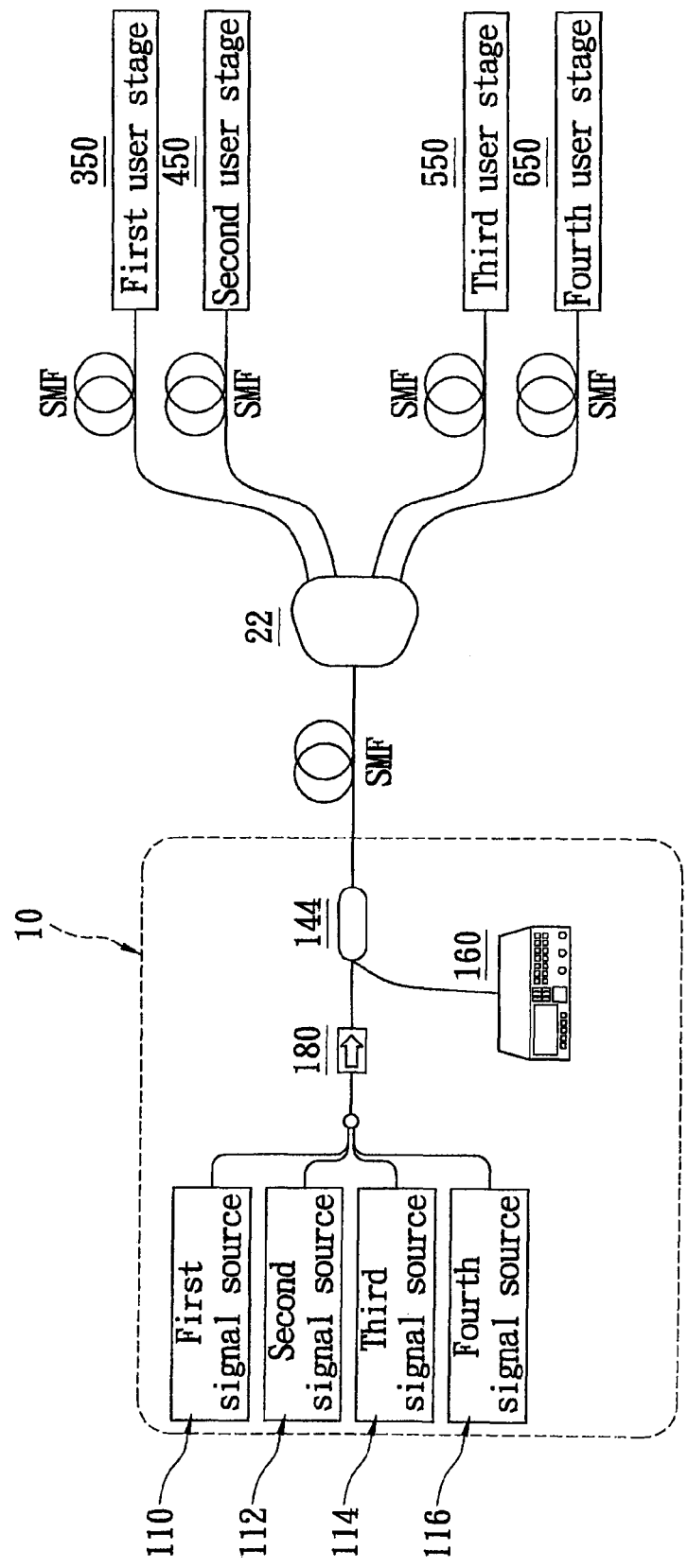
FIG. 5 is a structural diagram of the fourth embodiment of the detection system of the present invention for identifying faults.

The fourth embodiment of the present invention is shown in FIG. 5. The detection system of the fourth embodiment includes a main control section 10, a fiber trunk, a plurality of fiber branches, and a plurality of user stages. The main control section 10 connects to the fiber trunk and includes a plurality of signal sources, a coupling unit that includes a WDM coupler 144 and an optical coupler (not shown), and a fault position detection unit 160. For example, the signal sources can include the first signal source 110, the second signal source 112, the third signal source 114, and the fourth signal source 116. The user stages are respectively installed in the railhead of each fiber branch and can include the first user stage 350, the second user stage 450, the third user stage 550, and the fourth user stage 650.

The first signal source 110 provides the data signal $\lambda1$. The second signal source 112 provides the data signal $\lambda2$. The third signal source 114 provides the data signal $\lambda3$. The fourth signal source 116 provides the data signal $\lambda4$. Simultaneously, the fault position detection unit 160 provides the detection signals $\lambda51$ through $\lambda54$. The optical coupler couples the data signals with the detection signals for being further feed into the fiber trunk via the WDM coupler 144. The detection system further respectively feeds the data signals and the detection signals into a corresponding fiber branch via the array waveguide grating (AWG) 22 installed between the fiber trunk and each fiber branch.

The data signal $\lambda1$ and the detection signal $\lambda51$ are transmitted via the first fiber branch. The data signal $\lambda2$ and the detection signal $\lambda52$ are transmitted via the second fiber branch. The data signal $\lambda3$ and the detection signal $\lambda53$ are transmitted via the third fiber branch. The fourth data signal $\lambda4$ and the detection signal $\lambda54$ are transmitted via the fourth fiber branch.

Furthermore, the data signals are respectively transmitted to a corresponding user stage. The data signal $\lambda1$ is transmitted to the first user stage 350. The data signal $\lambda2$ is transmitted to the second user stage 450. The data signal $\lambda3$ is transmitted to the third user stage 550. The fourth data signal $\lambda4$ is transmitted to the fourth user stage 650.

When a fiber has a fault, the fault causes Fresnel reflection within the broken section. Hence, if the first fiber branch has a fault, not only the detection signal $\lambda51$ will be reflected, but also the data signal $\lambda1$ will be reflected due to the failure to act as a reflected signal $\lambda'51$. If the second fiber branch has a fault, not only the detection signal $\lambda52$ will be reflected, but also the data signal $\lambda2$ will be reflected due to the failure to act as a reflected signal $\lambda'52$. If the third fiber branch has a fault, not only the detection signal $\lambda53$ will be reflected, but also the data signal $\lambda3$ will be reflected due to the failure to act as a reflected signal $\lambda'53$. The same, if the fourth fiber branch has a fault, not only the detection signal $\lambda54$ will be reflected, but also the data signal $\lambda4$ will be reflected due to the failure to act as a reflected signal $\lambda'54$.

Finally, the reflected signal is transmitted to the fault position detection unit 160 via the WDM coupler 144. The fault position detection unit 160 can use the reflected signal to discover the position of the fault in the corresponding fiber branch. Moreover, if the fiber trunk has a fault, all of the data signals and the detection signals will be reflected by the fault. The fault position detection unit 160 uses the reflected signals to discover the position of the fault in the fiber trunk.

Figure 6:
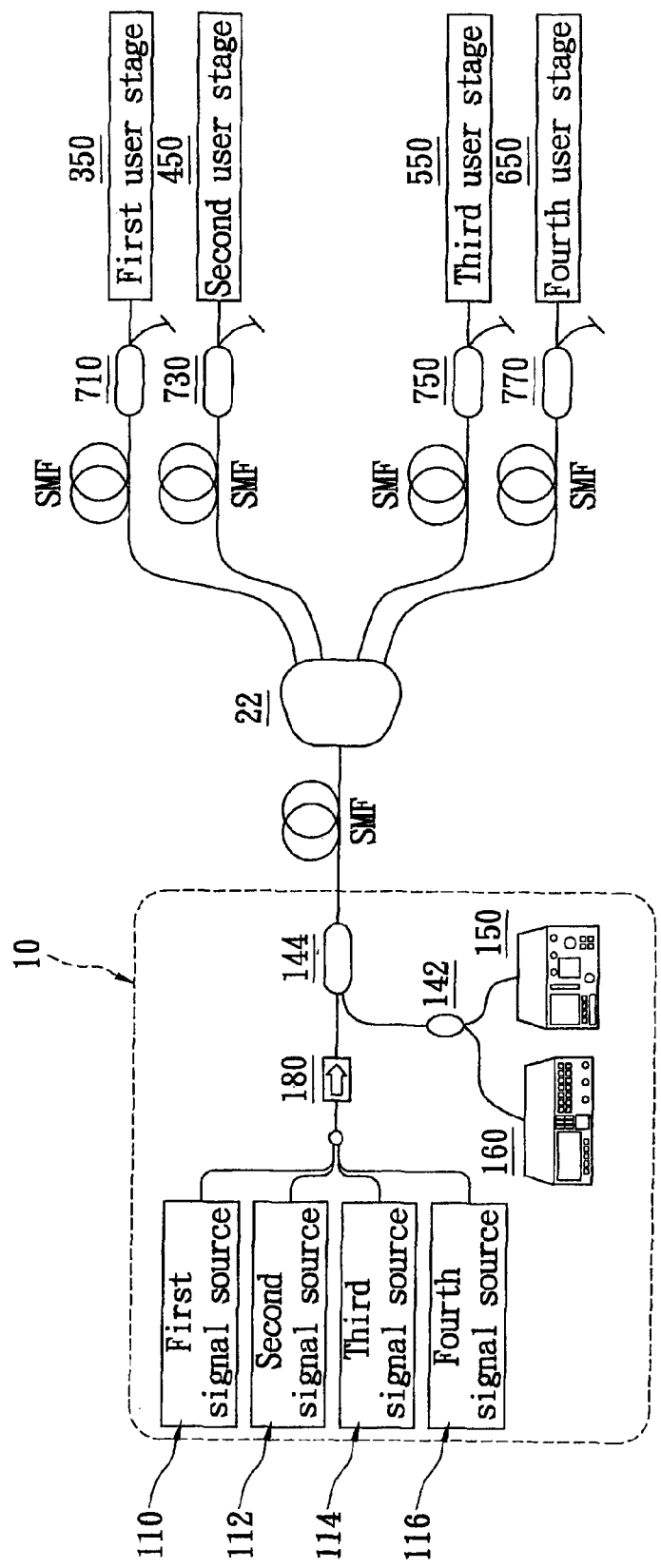
FIG. 6 is a structural diagram of the fifth embodiment of the detection system of the present invention for identifying faults.

The fifth embodiment of the present invention is shown in FIG. 6. The structure of the fifth embodiment is similar to the fourth embodiment, but it should be noted that the main control section 10 includes a plurality of signal sources, a proportion coupler 142, a WDM coupler 144, a hookup survival detection unit 150, and a fault position detection unit 160. Moreover, the proportion coupler 142 is associated with the WDM coupler 144 to act as a coupling unit.

The hookup survival detection unit 150 and the fault position detection unit 160 connect to the proportion coupler 142 which is in turn connected to the WDM coupler 144 that is installed upon the fiber trunk. Moreover, each fiber branch has a reflected unit that includes a WDM coupler and a reflector.

Each data signal transmitted via a corresponding fiber branch is coupled to a corresponding user stage via the corresponding WDM coupler. Each reflected signal transmitted via the corresponding fiber branch is coupled to a corresponding reflector, which is then reflected by the reflector to act as a reflected signal.

Next, the WDM coupler 144 couples the reflected signals $\lambda'51$ through $\lambda'54$ to the proportion coupler 142 and is further coupled to the hookup survival detection unit 150 and the fault position detection unit 160. Hence, the hookup survival detection unit 150 can use the reflected signal to determine whether the fiber trunk or each fiber branch has a fault or not. The fault position detection unit 160 can use the reflected signal to discover the position of the fault of the fiber trunk or each fiber branch.

If the fiber trunk or one of the fiber branches has a fault, the data signal and the detection signal will be directly reflected by the fault, but will not be transmitted to the corresponding reflector and the corresponding user stage.

Figure 7:
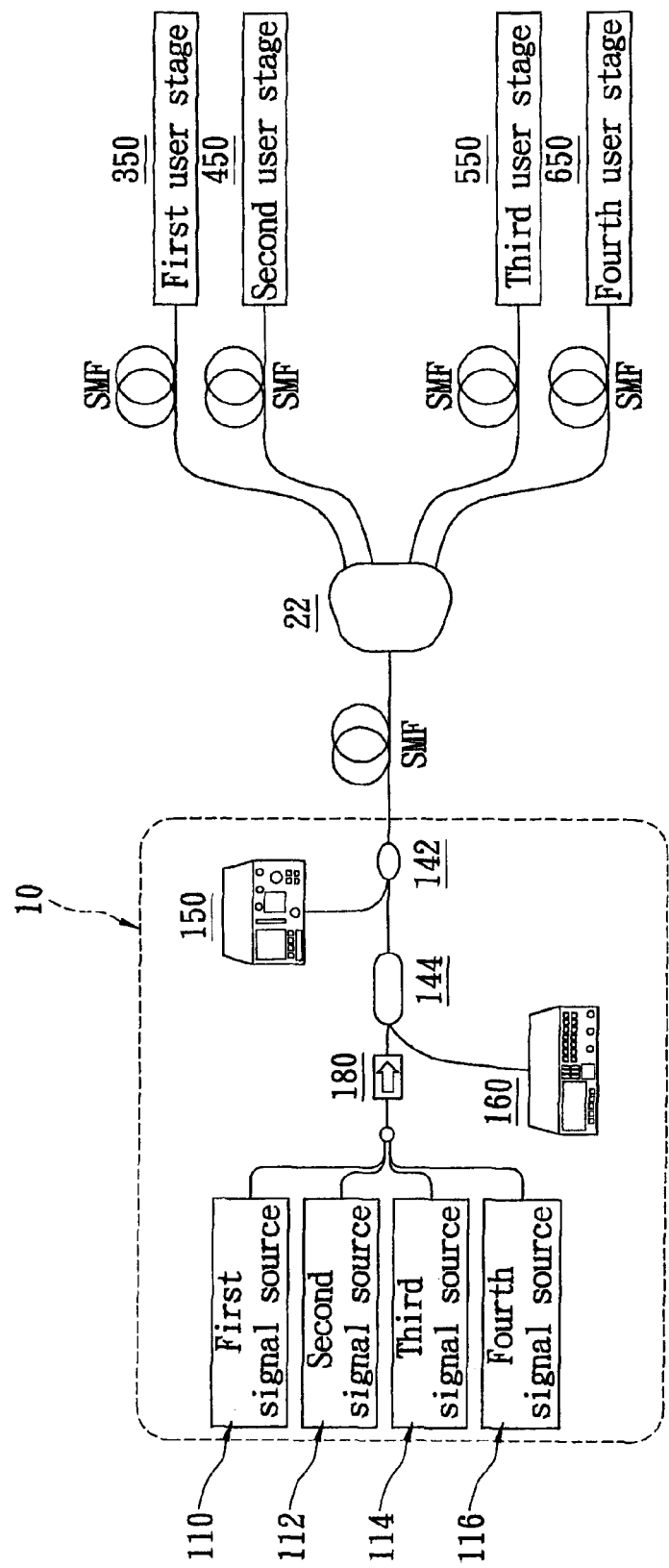
FIG. 7 is a structural diagram of the sixth embodiment of the detection system of the present invention for identifying faults.

The sixth embodiment of the present invention is shown in FIG. 7. The structure of the sixth embodiment is similar to the fourth embodiment, and it should be noted that the main control section 10 further includes a hookup survival detection unit 150 that connects to the fiber trunk via the proportion coupler 142 of the coupling unit. The fault position detection unit 160 connects to the fiber trunk via the WDM coupler 144 of the coupling unit.

When a fiber has a fault, the fault will cause Fresnel reflection at the broken section. Hence, if the first fiber branch has a fault, the detection signal $\lambda 51$ and the data signal $\lambda 1$ will be reflected by the fault to thereby generating the reflected signal $\lambda'51$. If the second fiber branch has a fault, the detection signal $\lambda 52$ and the data signal $\lambda 2$ will be reflected by the fault to thereby generating the reflected signal $\lambda'52$. If the third fiber branch has a fault, the detection signal $\lambda 53$ and the data signal $\lambda 3$ will be reflected by the fault to thereby generating the reflected signal $\lambda'53$. If the fourth fiber branch has a fault, the detection signal $\lambda 54$ and the data signal $\lambda 4$ will be reflected by the fault to thereby generating the reflected signal $\lambda'54$.

Finally, the reflected light is coupled proportionally to the hookup survival detection unit 150 via the proportion coupler 142, and the reflected signal is coupled to the fault position detection unit 160 via the WDM coupler 144. The hookup survival detection unit 150 can use the reflected signal to determine whether the fiber trunk or the fiber branch has a fault or not. The fault position detection unit 160 can use the reflected signal to discover the position of the fault in the fiber trunk or the corresponding fiber branch.

Figure 8:
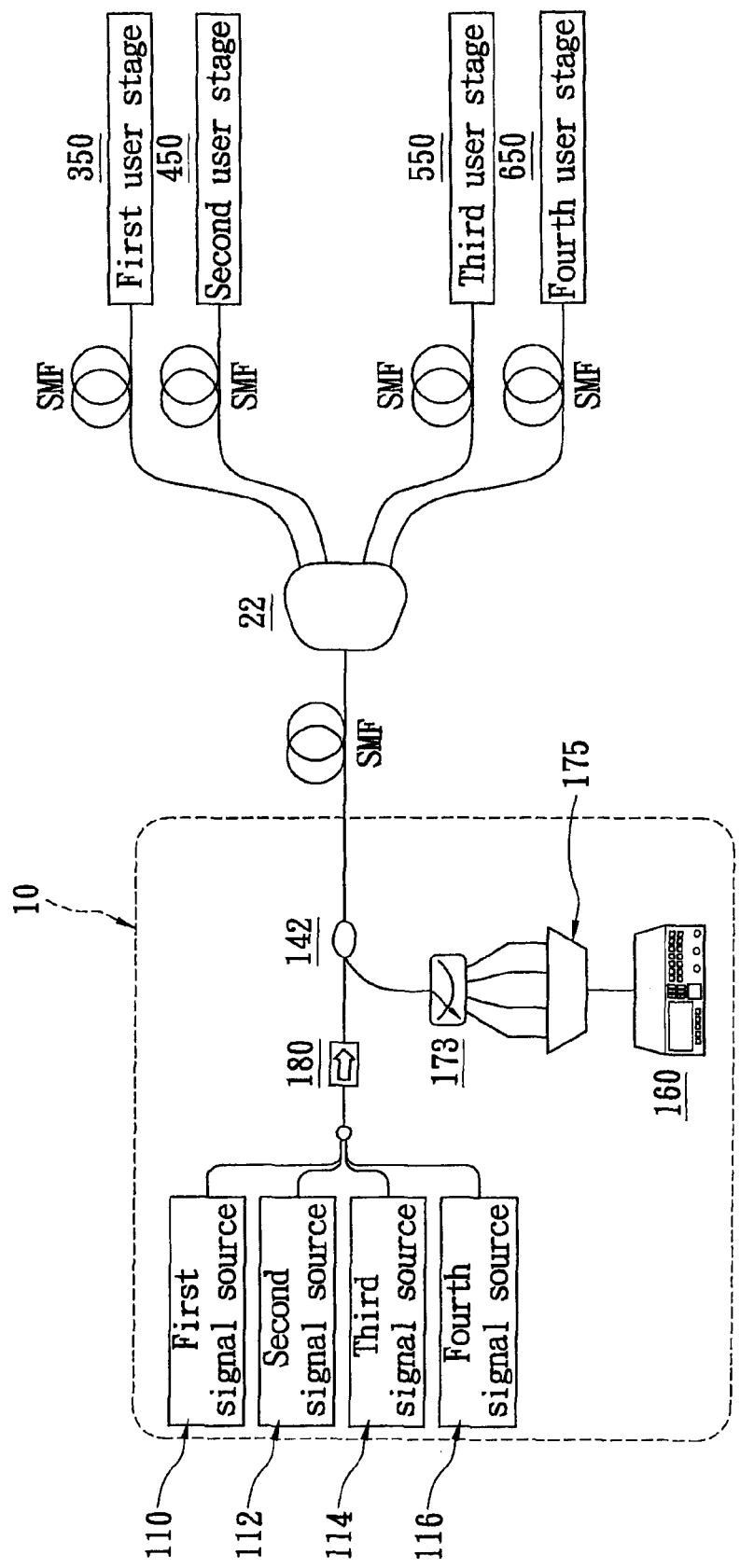
FIG. 8 is a structural diagram of the seventh embodiment of the detection system of the present invention for identifying faults.

The seventh embodiment of the present invention is shown in FIG. 8. The structure of the seventh embodiment is similar to the fourth embodiment, but it should be noted that the main control section 10 further includes a switch unit that includes a DWDM multiplexer 175 and a switch 173. The fault position detection unit 160 connects to the fiber trunk via the proportion coupler 142 of the coupling unit. Each of the switch paths corresponds to a corresponding fiber branch.

If the first fiber branch has a fault, the detection signal $\lambda 51$ and the data signal $\lambda 1$ will be reflected by the fault to generate the reflected signal $\lambda'51$. If the second fiber branch has a fault, the detection signal $\lambda 52$ and the data signal $\lambda 2$ will be reflected by the fault to thereby generating the reflected signal $\lambda'52$. If the third fiber branch has a fault, the detection signal $\lambda 53$ and the data signal $\lambda 3$ will be reflected by the fault to thereby generating the reflected signal $\lambda'53$. If the fourth fiber branch has a fault, the detection signal $\lambda 54$ and the data signal $\lambda 4$ will be reflected by the fault to thereby generating the reflected signal $\lambda'54$.

Finally, the reflected signal is coupled to the switch unit via the proportion coupler 142, and then the switch 173 selects one of the switch paths for the reflected signal. Hence, the DWDM multiplexer 175 can transmit the reflected signal of the selected switch path to the fault position detection unit 160. The fault position detection unit 160 can use the reflected signal to discover the position of the fault in the fiber trunk or the corresponding fiber branch.

Figure 9:
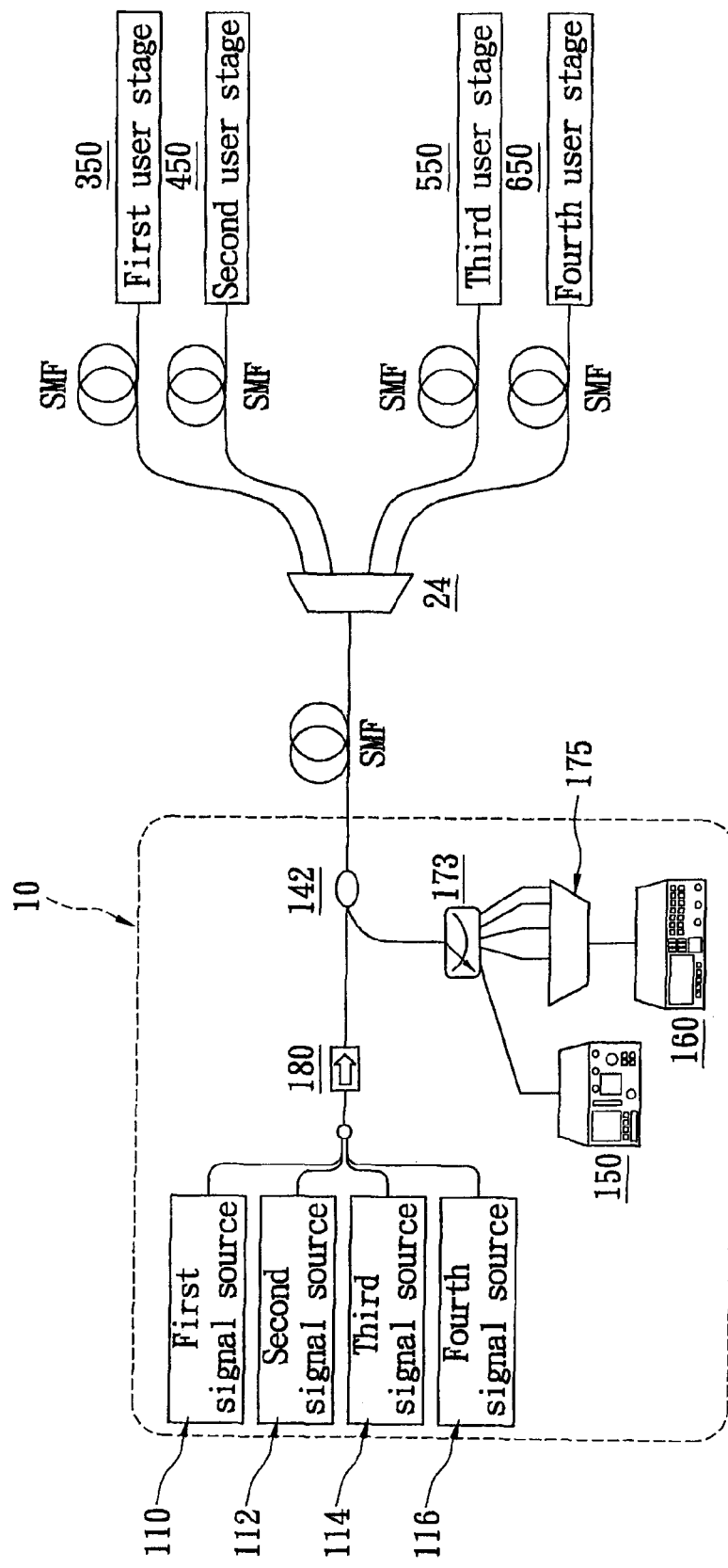
FIG. 9 is a structural diagram of the eighth embodiment of the detection system of the present invention for identifying faults.

The eighth embodiment of the present invention is shown in FIG. 9. The structure of the eighth embodiment is similar to the seventh embodiment, but it should be noted that the main control section 10 further includes a hookup survival detection unit 150 connected to the fiber trunk via the switch unit that includes the switch 173 and the proportion coupler 142.

The reflected signal is coupled to the switch unit via the proportion coupler 142, and then the switch 173 selects one of the switch paths for the reflected signal. For example, the present invention can first transmit the reflected signal from the first selected switch path to the hookup survival detection unit 150 and then transmit the reflected signal from the next selected switch path to the fault position detection unit 160 via the DWDM multiplexer 175. The hookup survival detection unit 150 can use the reflected signal to determine whether the fiber trunk or the corresponding fiber branch has a fault. The fault position detection unit 160 can use the reflected signal to discover the position of the fault in the fiber trunk or the corresponding fiber branch.

Figure 10:
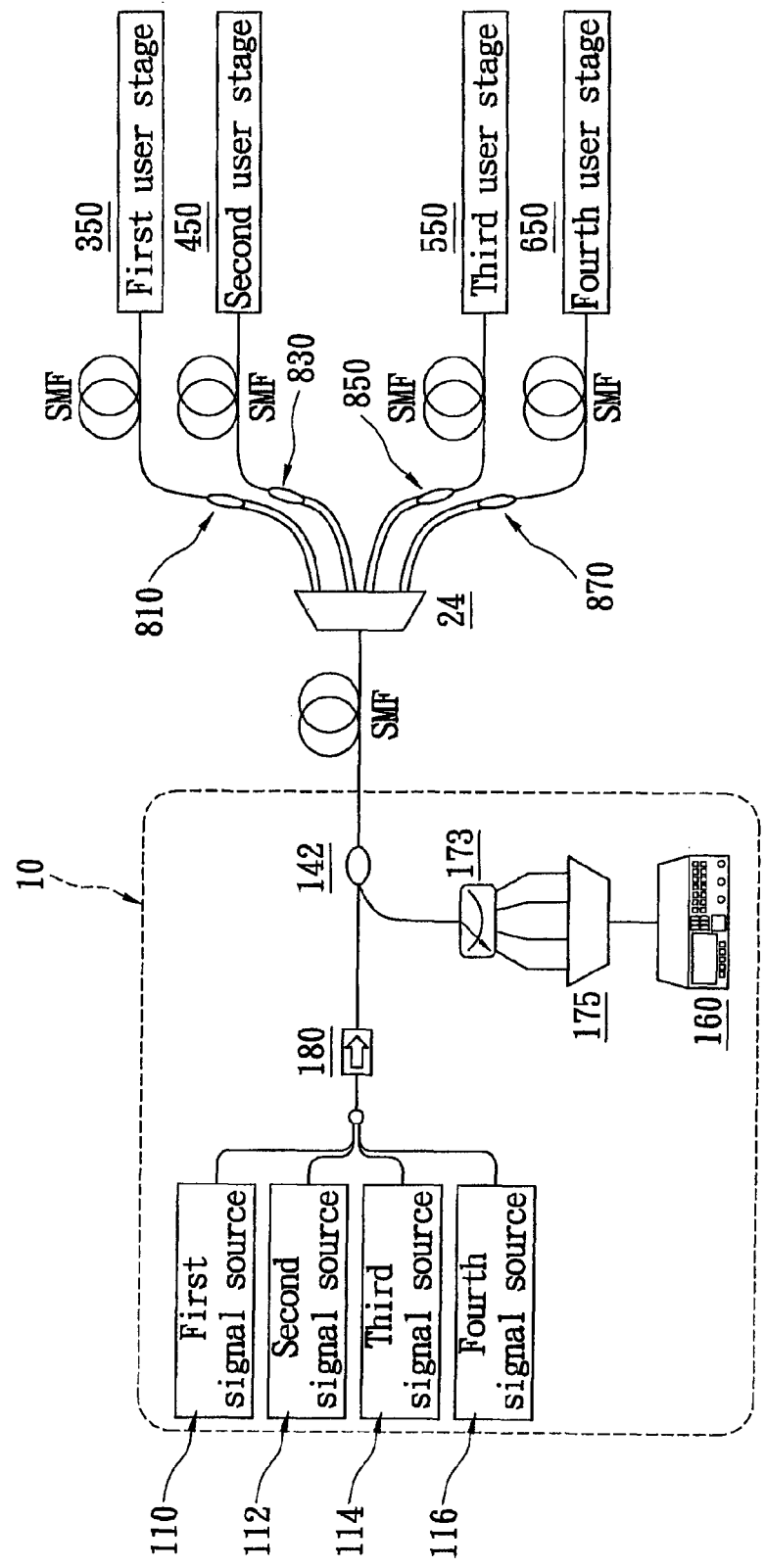
FIG. 10 is a structural diagram of the ninth embodiment of the detection system of the present invention for identifying faults.

The ninth embodiment of the present invention is shown in FIG. 10. The structure of the ninth embodiment is similar to the seventh embodiment, but it should be noted that the DWDM multiplexer 24 is used in substitution for the AWQ wherein the number of the channels of the DWDM multiplexer 24 is double the number of the user stages.

The DWDM multiplexer 24 respectively classifies the data signals and the detection signals into a plurality of groups according to the frequency of each data signal and the frequency of each detection signal. Each group is associated with a corresponding channel of the DWDM multiplexer 24, which is in turn associated with a corresponding fiber branch and a user stage. Each group is coupled to the corresponding fiber branch via the second coupling unit that includes a plurality of 1×2 couplers such as the 1×2 coupler 810, 830, 850, and 870, wherein each 1×2 coupler corresponds to the corresponding group.

The data signal $\lambda 1$ and the detection signal $\lambda 51$ are coupled to the first fiber branch by the 1×2 coupler 810. The data signal $\lambda 2$ and the detection signal $\lambda 52$ are coupled to the second fiber branch by the 1×2 coupler 830. The data signal $\lambda 3$ and the detection signal $\lambda 53$ are coupled to the third fiber branch by the 1×2 coupler 850. The fourth data signal $\lambda 4$ and the detection signal $\lambda 54$ are coupled to the fourth fiber branch by the 1×2 coupler 870.

The reflected signal is coupled to the switch unit via the proportion coupler 142, and then the switch 173 selects one of the switch paths for the reflected signal. Hence, the DWDM multiplexer 175 can transmit the reflected signal of the selected switch path to the fault position detection unit 160. The fault position detection unit 160 can use the reflected signal to discover the position of the fault in the fiber trunk or the corresponding fiber branch.

In the description of the fourth through the ninth embodiments, the fiber trunks and the fiber branches are single mode fibers. However, the present invention is not limited to the above description. The fiber trunks and the fiber branches can be single mode fibers, multimode fibers, or dispersion compensated fibers in the fourth through the ninth embodiments.

Moreover, the fiber trunk has an isolator installed near the feeding position of the data signals for further preventing the data signals from being negatively affected by the reflected signals in each of the embodiments of the present invention.

The description above only illustrates specific embodiments and examples of the invention. The invention should therefore cover various modifications and variations made to the herein-described structure and operation of the invention, provided they fall within the scope of the invention as defined in the following appended claims.

What is claimed is:

1. A detection system for identifying faults in a passive optical network, comprising:
   a proportion coupler coupling at least one data signal and at least one detection signal to a fiber trunk in proportion;
   a splitter transmitting the data signals and the detection signals to at least one fiber branch;
   a reflected and filtering unit filtering the detection signals and the data signals, wherein one of the detection signals conforming to a reflection capability of the reflected and filtering unit is reflected as a reflected signal, and the data signal conforming to a frequency range of the reflected and filtering unit is transmitted to a user stage via the fiber branch;
   a fault position detection unit providing the detection signals and utilizing the reflected signal to determine the position of a fault of the fiber branch,
   wherein the reflection capability is suitable for the fault position detection unit; and
   a hookup survival detection unit utilizing the reflected signal to determine whether there is a fault within the fiber branch, wherein the hookup survival detection unit is an optical spectrum analyzer.

2. The detection system according to claim 1, wherein the fiber trunk and the fiber branch are single mode fibers, multimode fibers, or dispersion compensated fibers.

3. The detection system according to claim 1, wherein the reflected and filtering unit includes at least one fiber Bragg grating and at least one fiber.

4. The detection system according to claim 1, wherein the reflected and filtering unit includes at least one reflective filter or at least one transflective filter.

5. A detection system for identifying faults in a passive optical network, comprising:
   a WDM coupler coupling at least one data signal and at least one detection signal within a fiber trunk;
   an array waveguide grating transmitting the data signal and the detection signal to a corresponding user stage connected to a corresponding fiber branch;
   a fault position detection unit providing the detection signal, and when a fault occurs within the fiber branch, the fault causes a reflected signal based on the detection signal; and
   a hookup survival detection unit determining whether the fiber branch has a fault according to the reflected signal;
   whereby, the fault position detection unit uses the reflected signal to identify the position of the fault.

6. The detection system according to claim 5, wherein the fiber trunk and the fiber branch are single mode fibers, multimode fibers, or dispersion compensated fibers.

7. The detection system according to claim 5, wherein the fault position detection unit connects to the WDM coupler.

8. The detection system according to claim 5, further comprising a proportion coupler connected to the hookup survival detection unit and installed upon the fiber trunk, wherein the proportion coupler cascades to the WDM coupler installed upon the fiber trunk.

9. The detection system according to claim 5, further comprising a reflected unit installed upon the fiber branch and reflected the detection signal to the hookup survival detection unit and the fault position detection unit.

10. The detection system according to claim 9, wherein the reflected unit comprises a second WDM coupler and a total internal reflector connected to the fiber branch via the WDM coupler of the reflected unit.

11. The detection system according to claim 5, further comprising a switch unit that is installed between the WDM coupler and the fault position detection unit and switches a corresponding path for the detection signal and the reflected signal, and the fault position detection unit feeds the detection signal into the fiber trunk or the fiber branch via the switch of the switch unit.

12. The detection system according to claim 11, wherein the switch unit includes a switch and a DWDM multiplexer.

13. A detection system for identifying faults in a passive optical network, comprising:
   a first coupling unit coupling at least one data signal and at least one detection signal to a fiber trunk in proportion;
   a DWDM multiplexer transmitting the data signal and the detection signal to a corresponding user stage through a fiber branch with a corresponding frequency band;
   a fault position detection unit providing the detection signal, and when a fault occurs within the fiber branch, the fault causes a reflected signal based on the detection signal; and
   a switch unit switching a plurality of paths in turn, wherein the switch unit includes a switch and a second DWDM multiplexer;
   whereby, the fault position detection unit uses the reflected signal to identify the position of the fault;
   whereby, the detection signal is fed into the fiber trunk through one of the paths according to the switch of the switch unit;
   whereby, the reflected signal is transmitted to the fault position detection unit through one of the paths according to the switch of the switch unit.

14. The detection system according to claim 13, further comprising a hookup survival detection unit that connects to the switch unit and determines whether the fiber branch has a fault according to the reflected signal.

15. The detection system according to claim 13, further comprising a second coupling unit that connects to the user stage and the DWDM multiplexer and couples the data signal with the detection signal for being further fed into the fiber branch.

16. The detection system according to claim 13, wherein the fiber trunk and the fiber branch are single mode fibers, multimode fibers, or dispersion compensated fibers.

* * * * *